United States Patent [19]

Ellis et al.

[11] 4,152,508

[45] May 1, 1979

[54] SILICONE-CONTAINING HARD CONTACT LENS MATERIAL

[75] Inventors: Edward J. Ellis, Rowley; Joseph C. Salamone, Marblehead, both of Mass.

[73] Assignee: Polymer Technology Corporation, Framingham, Mass.

[21] Appl. No.: 878,163

[22] Filed: Feb. 15, 1978

[51] Int. Cl.$^2$ .................. C08F 30/08; C08F 230/08; C08F 4/04; B29D 11/00

[52] U.S. Cl. ........................................ 526/279; 264/1; 351/160 H; 526/73; 526/218; 526/259; 526/264; 526/273; 526/278; 526/923

[58] Field of Search ............... 351/160; 526/279, 264, 526/273, 923, 265, 259, 278

[56] References Cited

U.S. PATENT DOCUMENTS 3,808,178   4/1974   Gaylord .............................. 526/279

*Primary Examiner*—Herbert J. Lilling
*Attorney, Agent, or Firm*—Wolf, Greenfield & Sacks

[57] ABSTRACT

An improved contact lens material is formed by a copolymer of a siloxanyl alkyl ester monomer, an itaconate ester and an ester of acrylic or methacrylic acid. The copolymer preferably includes a cross-linking agent and a hydrophilic monomer. Contact lenses made of the mterial can be readily machined and polished into hard contact lenses having excellent dimensional stability but also have extremely high permeability to oxygen.

14 Claims, No Drawings

SILICONE-CONTAINING HARD CONTACT LENS MATERIAL

BACKGROUND OF THE INVENTION

The contact lens art has long known the advantages of silicone polymers for use in contact lenses. Silicone polymers are transparent and highly permeable to oxygen, although use of these polymers in contact lenses sometimes causes difficulty in fabrication of lenses and often result in lenses with hydrophobic surfaces. It is known that the use of a methacrylate monomer containing a silicone moiety can be copolymerized with standard monomer utilized in conventional hard contact lenses, i.e., methyl methacrylate, to obtain a copolymer of varying hardness values depending upon the ratio of hard and soft monomers employed. Thus some attempts have been made in the art to produce hard oxygen permeable contact lenses. For example, U.S. Pat. No. 3,808,178 describes hard oxygen permeable contact lenses.

The silicone-containing polymers are normally soft materials with poor tear and rupture strength. Their use often causes machining problems in lenses since they impart low modulus to copolymers and cause other problems in that they are highly hydrophobic. Hydrophobic lenses are not wettable by tears and often result in vision and discomfort problems.

The oxygen permeability is directly related to the silicone content in contact lenses. It has been difficult to obtain high oxygen permeability while still maintaining other properties of a contact lens material at desired values when oxygen permeability is derived from the silicone content.

SUMMARY OF THE INVENTION

It is a primary object of this invention to provide a novel contact lens composition which is prepared from a combination of monomers so as to have high oxygen permeability, good hardness and ready machinability with good dimensional stability.

It is another object of this invention to provide contact lens materials in accordance with the preceding object which can have hydrophilic surfaces which are easily wettable by fluids in the eye and compatible with the eye without causing irritation over long periods of use.

According to the invention a contact lens material is made by copolymerizing (a) from 30 to 80% by weight of a siloxanyl alkyl ester monomer with (b) 5 to 60% by weight of an itaconate ester (c) 1 to 60% by weight of an ester of a $C_1$-$C_{20}$ monohydric or polyhydric alkanol or phenol and an acid selected from the class consisting of acrylic and methacrylic acid (d) 0.1 to 10% by weight of a cross-linking agent and preferably (e) 1 to 20% by weight of a hydrophilic monomer which imparts hydrophilic properties to the final composition.

Preferably polymerization is carried out by a free radical initiator, incorporated in amounts of from 0.01 to 2.0% by weight of the entire composition, at reaction temperatures of from 25° C. to 125° C. Bulk polymerization procedures can be used to produce hard, rigid transparent polymers which can be machined and polished to produce contact lenses which have high oxygen permeability.

It is a feature of this invention that the siloxanyl alkyl ester provides for high oxygen permeability while machinability strength and body compatible properties are provided by other portions of the copolymer. The itaconate ester gives increased rigidity, hardness and some degree of wettability. The methacrylate or acrylate esters provide for increased fracture strength as does the cross-linking agent which also adds dimensional stability to lenses made from the material. Hydrophilic monomer content greatly increases the wettability of the material to avoid eye irritation in use.

DESCRIPTION OF PREFERRED EMBODIMENTS

The novel copolymers preferably have 30 to 80% by weight of the siloxanyl alkyl ester monomer (a) since higher amounts negatively affect mechanical properties while lower amounts result in insufficient oxygen permeability. Best results are obtained when the copolymers have 40 to 55% by weight of (a). From 1 to 60% by weight of the itaconate ester (b) adds to the rigidity while if over that amount is used decreased oxygen permeability, due to decreased siloxanyl alkyl ester monomer content, may result. Most preferably, 20 to 40% by weight of (b) is used. Similarly, the acrylate or methacrylate (c) is limited to the amount necessary to increase the fracture strength to the desired amount or otherwise affect physical properties and is in the range of from 20 to 40% by weight. The cross-linking agent, in an amount of from 0.1 to 10% by weight, is necessary to get the required dimensional stability and fracture strength while increased amounts might decrease fracture strength. The hydrophilic monomer is used in just a large enough amount to provide the required degree of wettability without affecting other properties of the polymeric lens.

Polymerization under standard bulk polymerization techniques as known in the art for vinyl monomers of this type can be used. The free radical initiated reactions are preferred at conventional temperatures to insure complete conversion of the monomers to polymeric forms. Ordinarily polymerization is started at a temperature in the range of from 35° C. to 50° C. for from one to three days. The temperature is then raised preferably to 60° C. to 100° C. for another one-half to three days. At the end of this time, polymerization is normally completed. Complete polymerization can be accomplished in shorter or longer times which will vary with variations in temperature as known in the art.

The siloxanyl alkyl ester monomers useful in this invention preferably have the following formula:

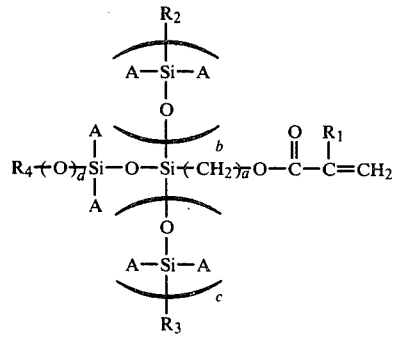

where $R_1$ is selected from the class of hydrogen or methyl groups, "a" is an integer from one to three, "b" and "c" are integers from zero to two, "d" is an integer from zero to one, A is selected from the class of methyl or phenyl groups, $R_2$ is selected from the class of methyl or phenyl groups, R₃ and R₄ represent either no group (cyclic ring from "c" to "d") or methyl or phenyl groups.

Representative siloxanyl alkyl ester monomers which could be utilized in this invention include methacryloyloxymethyl pentamethyldisiloxane
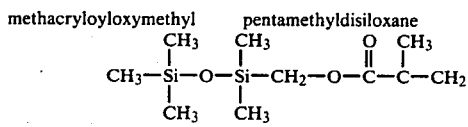

methacryloyloxypropyl tris(trimethylsilyl)siloxane
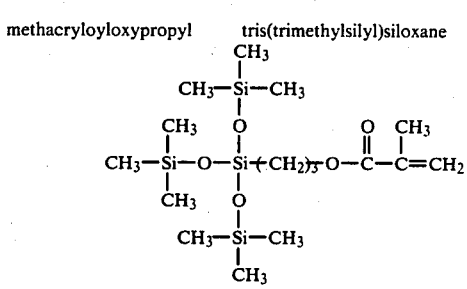

methacryloyloxymethyl heptamethylcyclotetrasiloxane
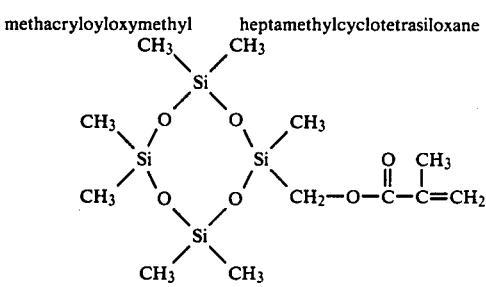

methacryloyloxypropyl heptamethylcyclotetrasiloxane
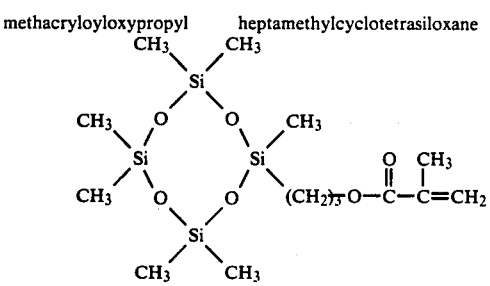

The itaconate esters useful in the present invention have the following structure:

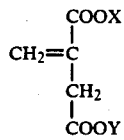

X and Y are the same or different and are hydrogen, methyl or phenyl groups. Representative mono- and di-itaconate esters include:
methyl itaconate
dimethyl itaconate
phenyl itaconate
diphenyl itaconate
methyl phenyl itaconate The fracture strength adding material is an ester of a $C_1$-$C_{20}$ monohydric or polyhydric alkanol, or phenol and an acid selected from the class consisting of acrylic and methacrylic acid. Such esters include:
methyl methacrylate
methyl phenylacrylate
phenyl methacrylate
cyclohexyl methacrylate Examples of cross-linking agents include polyfunctional derivatives of acrylic acid, methacrylic acid, acrylamide, methacrylamide and multi-vinyl substituted benzenes, including but not limited to the following:
ethylene glycol diacrylate or dimethacrylate
diethylene glycol diacrylate or dimethacrylate
tetraethylene glycol diacrylate or dimethacrylate
polyethylene glycol diacrylate or dimethacrylate
trimethylolpropane triacrylate or trimethacrylate
Bisphenol A diacrylate or dimethacrylate
ethoxylated Bisphenol A diacrylate or dimethacrylate
pentaerythritol tri- and tetraacrylate or methacrylate
tetramethylenediacrylate or dimethacrylate
methylene bisacrylamide or methacrylamide
dimethylene bisacrylamide or methacrylamide
N,N'-dihydroxyethylene bisacrylamide or methacrylamide
hexamethylene bisacrylamide or methacrylamide
decamethylene bisacrylamide or methacrylamide
divinyl benzene The wettable surface is provided by the inclusion of hydrophilic neutral monomers, hydrophilic cationic monomers and hydrophilic anionic monomers and mixtures of these.

The classes of these compounds are hydrophilic acrylates and methacrylates, acrylamides, methacrylamides, and vinyl lactams. Representative hydrophilic neutral monomers include:
2-hydroxyethyl acrylate or methacrylate
N-vinylpyrrolidone
acrylamide
methacrylamide
glyceryl acrylate or methacrylate
2-hydroxypropyl acrylate or methacrylate
polyethylene glycol monoacrylate or methacrylate The cationic monomers either can be initially in their charged form or are subsequently converted to their charged form after formation of the contact lens. The classes of these compounds are derived from basic or cationic acrylates, methacrylates, acrylamides, methacrylamides, vinylpyridines, vinylimidazoles, and diallyldialkylammonium polymerizable groups. Such monomers are represented by:
N,N-dimethylaminoethyl acrylate and methacrylate
2-methacryloyloxyethyltrimethylammonium chloride and methylsulfate
2-, 4-, and 2-methyl-5-vinylpyridine
2-, 4-, and 2-methyl-5-vinylpyridinium chloride and methylsulfate
N-(3-methacrylamidopropyl)-N,N-dimethylamine
N-(3-methacrylamidopropyl)-N,N,N-trimethylammonium chloride
1-vinyl- and 2-methyl-1-vinylimidazole
1-vinyl- and 2-methyl-1-vinylimidazolium chloride and methylsulfate
N-(3-acrylamido-3-methylbutyl)-N,N-dimethylamine
N-(3-acrylamido-3-methylbutyl)-N,N,N-trimethylammonium chloride
N-(3-methacryloyloxy-2-hydroxylpropyl)-N,N,N-trimethylammonium chloride
diallyldimethylammonium chloride and methylsulfate The anionic monomers either are in their neutral form initially or are subsequently converted to their anionic form. These classes of compounds include polymerizable monomers which contain carboxy, sulfonate, and phosphate or phosphonate groups. Such monomers are represented by:
acrylic acid
methacrylic acid
sodium acrylate and methacrylate
vinylsulfonic acid
sodium vinylsulfonate
p-styrenesulfonic acid
sodium p-styrenesulfonate
2-methacryloyloxyethylsulfonic acid
3-methacryloyloxy-2-hydroxypropylsulfonic acid
2-acrylamido-2-methylpropanesulfonic acid
allylsulfonic acid
2-phosphatoethyl methacrylate The copolymers described in this invention are prepared by radical polymerization through the incorporation of a free radical initiator. The initiator is chosen from those commonly utilized to polymerize vinyl type monomers and would include the following representative initiators:
2,2'-azo-bis-isobutyronitrile
4,4'-azo-bis-(4-cyanopentanoic acid)
t-butyl peroctoate
benzoyl peroxide
lauroyl peroxide
methyl ethyl ketone peroxide
diisopropyl peroxycarbonate The free radical initiator is normally used in amounts of from 0.01 to 2% by weight of the entire compound.

The materials of this invention can be polymerized directly in a suitable mold to form contact lenses. The materials are all thermosetting and thus various methods of fabrication can be used. It is preferable to polymerize into sheet or rod stock from which contact lenses may be machined.

It is preferred to use the conventional approach when forming contact lenses such as used for polymethyl methacrylate (PMMA). In this approach, the formulations are polymerized directly into a sheet or rod and the contact lenses are cut as buttons, discs or other preformed shapes which are then machined to obtain the lens surfaces. The resulting polymeric stock of buttons possesses the optical qualities necessary to produce aberration-free oxygen permeable, hard contact lenses in accordance with this invention.

The following examples are given to illustrate the invention and not meant to be limiting:

EXAMPLE 1

Hard, oxygen permeable contact lenses are made from a comonomer mixture of dimethyl itaconate (DMI), methyl methacrylate (MMA), methacryloxyloxypropyl tris(trimethylsilyl) siloxane (TRIS), methacrylic acid (MA), and tetraethylene glycol dimethacrylate (TGD) using the free radical initiator 2,2'-azobisisobutyronitrile (AIBN). The formulation components (shown in Table I in parts by weight) are thoroughly mixed, transferred to test tubes, stoppered, degassed, then filled with nitrogen. The test tubes are placed in a water bath at 40° C. and allowed to polymerize for a specified time, usually two days. The tubes are then placed in a 60° C. oven for an additional time period, generally two days, after which the polymerized rods are removed from the tubes. The rods are then subjected to conditioning for approximately eighteen hours at 100° C. under vacuum to complete the polymerization process and relieve any mechanical stresses present. The conditioned rods are then machined to discs of the size 3/16 inch by ⅛ inch, which are of the conventional form for hard polymethyl methacrylate lens blanks.

Oxygen permeability values of the contact lenses were generated by a procedure as described in ASTM D1434 except that plano contact lenses are used instead of large flat discs of material. The permeability apparatus was constructed in such a manner as to accept actual contact lenses and calibrated with other polymeric lenses of known permeability. As a comparison to the oxygen permeability data reported in Table I, polymethyl methacrylate, polycarbonate, and polystyrene have oxygen permeabilities of 1, 22, and 35 $cm^3$ mm/$cm^2$ sec cmHg$\times 10^{-10}$, respectively. The formulations of Table I illustrate the change in oxygen permeability with a change in DMI, MMA, and TRIS concentrations.

Table I

| Composition (wt. percent reagent) | | | | | | Oxygen Permeability* |
|---|---|---|---|---|---|---|
| DMI | MMA | TRIS | MA | TGD | AIBN | |
| 27.7 | 27.7 | 37.0 | 4.6 | 2.8 | 0.2 | 93 |
| 25.0 | 25.0 | 40.8 | 4.5 | 4.5 | 0.2 | 160 |
| 22.7 | 22.7 | 45.4 | 4.5 | 4.5 | 0.2 | 198 |

*Value in $cm^3$ mm/$cm^2$ sec cmHg $\times 10^{10}$

EXAMPLE 2

Using the experimental procedure of Example 1, this Example illustrates the preparation and oxygen permeabilities of hard contact lenses in which the cross-linking density is changed. The concentration of reagents employed and the oxygen permeabilities of the resulting materials are given in Table II. The permeability decrease noted is the result of both increasing cross-link density and decreasing siloxane content.

TABLE II

| Composition(wt. percent reagent) | | | | | | Oxygen Permeability* |
|---|---|---|---|---|---|---|
| DMI | MMA | TRIS | MA | TGD | AIBN | |
| 23.55 | 23.55 | 47.1 | 4.7 | 0.9 | 0.2 | 205 |
| 23.3 | 23.3 | 46.6 | 4.7 | 1.9 | 0.2 | 185 |
| 23.1 | 23.1 | 46.2 | 4.6 | 2.8 | 0.2 | 180 |
| 22.9 | 22.9 | 45.8 | 4.6 | 3.6 | 0.2 | 175 |
| 22.7 | 22.7 | 45.4 | 4.5 | 4.5 | 0.2 | 175 |

*Value in $cm^3$ mm/$cm^2$ sec cmHg $\times 10^{10}$

EXAMPLE 3

In this Example, the procedures of Examples 1 and 2 are followed. This Example illustrates the inherent hardness of a formulation containing DMI and TRIS in comparison to formulations containing MMA as a partial replacement for DMI. All formulations were prepared under identical conditions.

| Composition(wt. percent reagent) | | | | | ASTM Rockwell-R Hardness |
|---|---|---|---|---|---|
| DMI | MMA | TRIS | EGD | AIBN | |
| 71.4 | — | 23.8 | 4.7 | 0.1 | 120.5 |
| 47.6 | 23.8 | 23.8 | 4.7 | 0.1 | 119.0 |
| 23.8 | 47.6 | 23.8 | 4.7 | 0.1 | 118.5 |

EXAMPLE 4

This Example illustrates the inherent wettability of a formulation containing DMI and TRIS in comparison to formulations containing MMA as a partial replacement for DMI. The values presented represent the advancing(A) and retreating(R) water droplet angle on the flat, polished surface of hydrated specimens. Lower angles are indicative of more wettable materials.

| Composition(wt. percent reagent) | | | | | Angle in degrees | |
|---|---|---|---|---|---|---|
| DMI | MMA | TRIS | EGD | AIBN | A | R |
| 71.4 | — | 23.8 | 4.7 | 0.1 | 83 | 32 |
| 47.6 | 23.8 | 23.8 | 4.7 | 0.1 | 85 | 35 |
| 23.8 | 47.6 | 23.8 | 4.7 | 0.1 | 88 | 37 |

The above Examples illustrate the outstanding properties of the resulting polymers of this invention. In great measure these properties are enhanced by the use of the itaconate ester.

Other additives to the polymers of this invention as known in the art can be made. In all cases, the polymers are optically clear and meet required standards of contact lenses. However, additives such as from 0.1 to 2% by weight of conventional inert colorants and tints such as carbon black can be used. In all cases, the itaconate ester enables one to obtain an oxygen permeable lens with good optical clarity, a high hardness value and good dimensional stability. The oxygen permeability of the lenses of this invention is preferably in the range of from about 38 $cm^3\ mm/cm^2\ sec\ cmHg \times 10^{-10}$ to about 500 $cm^3\ mm/cm^2\ sec\ cmHg \times 10^{-10}$. The hardness values of the lenses are preferably in the range of from a minimum of 100 to 125 (ASTM D-785 R Scale Rockwell) or above.

While we have described specific examples of this invention, many variations are possible within the scope of keeping the physical properties as described above. Such variations include the use of mixtures of monomers within the components to make up the required percentages of each. For example, two or more siloxanyl alkyl ester monomers can be used instead of a single such monomer for that component of the system. Similarly, two or more cross-linking agents can be used. Conventional additives to the lenses such as colorants, tints and the like may also be employed within the normal ranges of such materials.

What is claimed is:

1. An oxygen permeable, hard, machinable, dimensionally stable, hydrophilic, contact lens material of high transparency consisting essentially of a polymer formed by free radical polymerization from (a) 30–80% by weight of a siloxanyl alkyl ester monomer having the following formula:

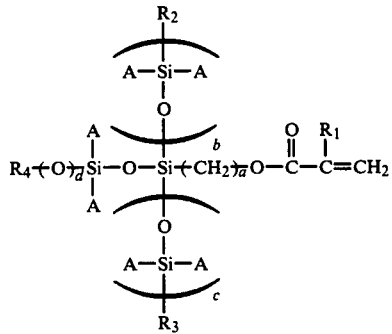

where $R_1$ is selected from the class of hydrogen or methyl groups, "a" is an integer from one to three, "b" and "c" are integers from zero to two, "d" is an integer from zero to one, A is selected from the class of methyl or phenyl groups, $R_2$ is selected from the class of methyl or phenyl groups, $R_3$ and $R_4$ represent either no group (cyclic ring from "c" to "d") or methyl or phenyl groups, (b) 5 to 60% by weight of an itaconate mono- or di-ester, (c) 1 to 60 parts by weight of an ester of a $C_1$-$C_{20}$ monohydric or polyhydric alkanol or phenol and an acid selected from the class consisting essentially of acrylic and methacrylic acid, (d) 0.1 to 10% by weight of a cross-linking agent, (e) 1 to 20% by weight of a hydrophilic monomer to impart hydrophilic properties to the surface of the contact lens material of this invention.

2. A contact lens material in accordance with claim 1 wherein said siloxanyl alkyl ester monomer (a) is present in an amount of from 40 to 55% by weight, said itaconate ester (b) is present in an amount of from 20 to 40% by weight, said ester (c) is present in an amount of from 20 to 40% by weight, said cross-linking agent is present in an amount of from 0.1 to 10% by weight, and said hydrophilic monomer is present in an amount of from 1 to 20% by weight of the entire composition.

3. A contact lens material in accordance with claim 1 wherein said ester of a $C_1$-$C_{20}$ monohydric or polyhydric alkanol or phenol and an acid selected from the class consisting essentially of acrylic and methacrylic acid is methyl methacrylate.

4. A contact lens material in accordance with claim 3 wherein said siloxanyl alkyl ester monomer is selected from the class consisting essentially of methacryloyloxymethyl pentamethyldisiloxane, methacryloyloxypropyl tris(trimethylsilyl) siloxane, methacryloyloxymethyl heptamethylcyclotetrasiloxane and methacryloyloxypropyl heptamethylcyclotetrasiloxane.

5. A contact lens material in accordance with claim 4 wherein said itaconate ester is selected from the class consisting essentially of methyl itaconate, dimethyl itaconate, phenyl itaconate, diphenyl itaconate and methyl phenyl itaconate.

6. A contact lens material in accordance with claim 5 wherein said material has an oxygen permeability in the range of from about 38 $cm^3\ mm/cm^2\ sec\ cmHg \times 10^{-10}$ to about 500 $cm^3\ mm/cm^2\ sec\ cmHg \times 10^{-10}$.

7. A contact lens material in accordance with claim 1 wherein said material has an oxygen permeability in the range of from about 38 $cm^3\ mm/cm^2\ sec\ cmHg \times 10^{-10}$ to about 500 $cm^3\ mm/cm^2\ sec\ cmHg \times 10^{-10}$.

8. A contact lens material in accordance with claim 2 wherein said material has an oxygen permeability in the range of from about 38 $cm^3\ mm/cm^2\ sec\ cmHg \times 10^{-10}$ to about 500 $cm^3\ mm/cm^2\ sec\ cmHg \times 10^{-10}$.

9. An oxygen permeable, hard, machinable, dimensionally stable, hydrophilic contact lens consisting essentially of a polymer formed by free radical polymerization from (a) 30–80% by weight of a siloxanyl alkyl ester monomer having the following formula:

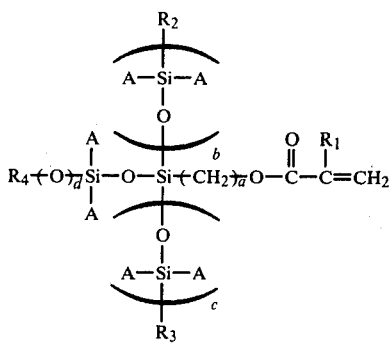

where $R_1$ is selected from the class of hydrogen or methyl groups, "a" is an integer from one to three, "b" and "c" are integers from zero to two, "d" is an integer from zero to one, A is selected from the class of methyl or phenyl groups, $R_2$ is selected from the class of methyl or phenyl groups, $R_3$ and $R_4$ represent either no group- (cyclic ring from "c" to "d") or methyl or phenyl groups, (b) 5 to 60% by weight of an itaconate mono- or di-ester, (c) 1 to 60 parts by weight of an ester of a $C_1$-$C_{20}$ monohydric or polyhydric alkanol or phenol and an acid selected from the class consisting essentially of acrylic and methacrylic acid, (d) 0.1 to 10% by weight of a cross-linking agent, (e) 1 to 20% by weight of a hydrophilic monomer to impart hydrophilic properties to the surface of the contact lens material of this invention.

10. An oxygen permeable, hard, machinable, dimensionally stable, hydrophilic contact lens in accordance with claim 9 wherein said siloxanyl alkyl ester monomer (a) is present in an amount of from 40 to 55% by weight, said itaconate ester (b) is present in an amount of from 20 to 40% by weight, said ester (c) is present in an amount of from 20 to 40% by weight, said cross-linking agent is present in an amount of from 0.1 to 10% by weight, and said hydrophilic monomer is present in an amount of from 1 to 20% by weight of the entire composition.

11. An oxygen permeable, hard, machinable, dimensionally stable, hydrophilic contact lens in accordance with claim 9 wherein said ester of a $C_1$-$C_{20}$ monohydric or polyhydric alkanol or phenol and an acid selected from the class consisting essentially of acrylic and methacrylic acid is methyl methacrylate.

12. An oxygen permeable, hard, machinable, dimensionally stable, hydrophilic contact lens in accordance with claim 11 wherein said siloxanyl alkyl ester monomer is selected from the class consisting essentially of methacryloyloxymethyl pentamethyldisiloxane, methacryloyloxypropyl tris(trimethylsilyl) siloxane, methacryloyloxymethyl heptamethylcyclotetrasiloxane and methacryloyloxypropyl heptamethylcyclotetrasiloxane.

13. An oxygen permeable, hard, machinable, dimensionally stable, hydrophilic contact lens in accordance with claim 12 wherein said itaconate ester is selected from the class consisting essentially of methyl itaconate, dimethyl itaconate, phenyl itaconate, diphenyl itaconate and methyl phenyl itaconate.

14. A hard, oxygen permeable contact lens having good dimensional stability, high transparency and formed by free radical copolymerization of dimethyl itaconate, methyl methacrylate, methacryloxyloxypropyl tris (trimethylsilyl) siloxane, methacrylic acid and tetraethylene glycol dimethacrylate, said lens having an oxygen permeability in the range of from 38 to 500 $cm^3$ mm/$cm^2$ sec cmHg $\times 10^{-10}$ and a Rockwell Hardness value of from 100 to 125 ASTM D-785 R scale.

* * * * *